(12) United States Patent  (10) Patent No.: US 8,288,880 B2
Olsen et al.  (45) Date of Patent: Oct. 16, 2012

(54) POWER GENERATOR SYSTEM (75) Inventors: Odd A. Olsen, Oslo (NO); Erling A. Skaar, Seattle, WA (US)

(73) Assignee: Gen-Tech LLC, Seattle, WA (US)

( * ) Notice: Subject to any disclaimer, the term of this patent is extended or adjusted under 35 U.S.C. 154(b) by 421 days.

(21) Appl. No.: 12/764,290

(22) Filed: Apr. 21, 2010

(65) Prior Publication Data

US 2010/0264885 A1  Oct. 21, 2010

Related U.S. Application Data (60) Provisional application No. 61/171,407, filed on Apr. 21, 2009.

(51) Int. Cl.
H02P 9/48 (2006.01)
(52) U.S. Cl. .................................... 290/40 C
(58) Field of Classification Search ................ 290/40 C
See application file for complete search history.

(56) References Cited

U.S. PATENT DOCUMENTS

| | | | |
|---|---|---|---|
| 3,714,846 A | 2/1973 | Louis | |
| 3,774,217 A | 11/1973 | Bonner | |
| 3,806,733 A | 4/1974 | Haanen | |
| 3,832,965 A | 9/1974 | Walker | |
| 3,866,420 A * | 2/1975 | Appel | 60/445 |
| 4,022,021 A | 5/1977 | Russell, Jr. | |
| 4,031,702 A | 6/1977 | Burnett | |
| 4,149,092 A | 4/1979 | Cros | |
| 4,206,608 A | 6/1980 | Bell | |
| 4,229,661 A | 10/1980 | Mead | |
| 4,232,570 A | 11/1980 | Gibson | |
| 4,259,881 A | 4/1981 | Meyerle | |
| 4,274,010 A | 6/1981 | Lawson-Tancred | |
| 4,280,061 A | 7/1981 | Lawson-Tancred | |
| 4,341,132 A | 7/1982 | Burdick | |
| 4,347,701 A | 9/1982 | Eddens | |
| 4,447,738 A | 5/1984 | Allison | |
| 4,461,957 A | 7/1984 | Jallen | |

(Continued)

FOREIGN PATENT DOCUMENTS

DE 3902138 A1 * 7/1990

(Continued)

OTHER PUBLICATIONS

Cidrás J., and C. Carrillo, "Regulation of Synchronous Generators by Means of Hydrostatic Transmissions," IEEE Transactions on Power Systems 15(2):771-778, May 2000.

(Continued)

*Primary Examiner* — Joseph Waks
(74) *Attorney, Agent, or Firm* — Christensen O'Connor Johnson Kindness PLLC (57) ABSTRACT

A power generating system includes a main engine operated over a range of speeds, an electric generator, and a hydrostatic transmission drivably connecting the engine with the generator to drive the generator at a desired speed. The hydrostatic transmission includes one or more variable pumps. A controller monitors the pump pressure and the generator frequency. The pressure set point is used with the monitored pressure to control the pump output. The pressure set point varies with the generator load, and is adjusted based on the deviation of the generator frequency from a predetermined desired electric power frequency. When multiple pumps are used to drive the motor, the pumps are operated sequentially such that all except one pump is either off or at maximum output.

18 Claims, 6 Drawing Sheets

U.S. PATENT DOCUMENTS

| | | | |
|---|---|---|---|
| 4,496,846 A | 1/1985 | Parkins | |
| 4,496,847 A | 1/1985 | Parkins | |
| 4,498,017 A | 2/1985 | Parkins | |
| 4,597,352 A | 7/1986 | Norminton | |
| 4,613,763 A | 9/1986 | Swansen | |
| 4,713,896 A | 12/1987 | Jennens | |
| 4,774,855 A | 10/1988 | Murrell | |
| 5,027,000 A | 6/1991 | Chino | |
| 5,048,445 A | 9/1991 | Lever | |
| 5,319,610 A | 6/1994 | Airhart | |
| 5,373,198 A | 12/1994 | Lopez Jimenez | |
| 5,635,689 A | 6/1997 | Shepard | |
| 5,778,671 A | 7/1998 | Bloomquist | |
| 5,865,602 A | 2/1999 | Nozari | |
| 5,924,283 A | 7/1999 | Burke, Jr. | |
| 6,082,084 A | 7/2000 | Reimers | |
| 6,129,525 A | 10/2000 | Reynolds | |
| 6,166,349 A | 12/2000 | Williams | |
| 6,265,785 B1 | 7/2001 | Cousineau | |
| 6,349,882 B1 | 2/2002 | Kita | |
| 6,527,660 B1 | 3/2003 | Sugden | |
| 6,644,004 B2 | 11/2003 | Reimers | |
| 6,748,737 B2 | 6/2004 | Lafferty | |
| 6,857,253 B2 | 2/2005 | Reimers | |
| 6,927,503 B2 | 8/2005 | Enis | |
| 6,963,802 B2 | 11/2005 | Enis | |
| 7,053,498 B1 | 5/2006 | Boisvert | |
| 7,067,937 B2 | 6/2006 | Enish | |
| 7,081,689 B2 | 7/2006 | Tilscher | |
| 7,095,131 B2 | 8/2006 | Mikhail | |
| 7,183,664 B2 | 2/2007 | McClintic | |
| 7,231,763 B2 | 6/2007 | Suzuki | |
| 7,250,691 B2 | 7/2007 | Enis | |
| 7,259,471 B2 | 8/2007 | Basteck | |
| 7,436,086 B2 | 10/2008 | McClintic | |
| 7,459,800 B2 * | 12/2008 | Boisvert et al. | 290/40 C |
| 7,485,979 B1 | 2/2009 | Staalesen | |
| 7,759,811 B2 * | 7/2010 | Boisvert et al. | 290/43 |
| 2002/0125723 A1 | 9/2002 | Staalesen | |
| 2008/0022686 A1 | 1/2008 | Amdall | |
| 2008/0083222 A1 | 4/2008 | Hubert | |
| 2010/0097038 A1 * | 4/2010 | Boisvert et al. | 322/34 |
| 2010/0097040 A1 * | 4/2010 | Boisvert et al. | 322/40 |

FOREIGN PATENT DOCUMENTS

| | | | |
|---|---|---|---|
| FR | 2553349 A1 * | 4/1985 | |
| JP | 3-217622 A | 9/1991 | |
| JP | 05-201631 A | 8/1993 | |
| JP | 05-286671 A | 11/1993 | |
| JP | 2-744706 B2 | 4/1998 | |
| JP | 11-287178 A | 10/1999 | |
| JP | 2002349411 A * | 12/2002 | |
| JP | 2005-248738 A | 9/2005 | |

OTHER PUBLICATIONS

Wu, K., et al., "Modelling and Identification of a Hydrostatic Transmission Hardware-in-the-Loop Simulator," International Journal of Vehicle Design 34(1):63-75, 2004.

International Search Report and Written Opinion mailed Dec. 6, 2010, issued in corresponding International Application No. PCT/US2010/031927, filed Apr. 21, 2010, 7 pages.

* cited by examiner

POWER GENERATOR SYSTEM

CROSS-REFERENCE TO RELATED APPLICATION

This application claims the benefit of Provisional Application No. 61/171,407, filed Apr. 21, 2009, the entire disclosure of which is hereby incorporated by reference herein.

BACKGROUND

Modern electrical and electronic equipment using alternating current often requires a reliable energy source producing a constant frequency output. For example, in marine and other mobile applications a reliable constant-frequency power source is needed by sensitive electronic equipment, such as navigational equipment and other electrical devices.

The primary power source for propulsion on mobile systems, typically a diesel or gas-powered engine, is operated over a wide range of speeds as required to provide the desired motive force. The variable operating speed of the primary power engine has therefore been considered ill suited for driving the onboard electric power generator(s). Commercial and/or larger recreational watercraft frequently use on-board auxiliary diesel engines or the like that are operated at a constant speed to drive the electric generators for producing the necessary electric power for electrical and electronic equipment. The auxiliary engine is independent of the main engine, and therefore the system can provide electric power to the vessel even when the main engine is not operating. However, a major disadvantage of such conventional systems is that they require one or more auxiliary engines, and result in increased fuel consumption and related costs. Such systems are costly to purchase, install, maintain, and operate.

Alternatively, it is known that electric power may be generated using a shaft-driven generator powered directly by the vessel's main engine. A direct-drive system can produce electric power very economically and with relatively low additional effluent of hydrocarbon to the environment. However, to produce a stable electric power output a direct-drive electric generator system requires operation of the main engine for power, and at a constant speed, and is therefore only applicable to a few types of vessels.

Previously disclosed systems that attempt to overcome these problems generally provide a hydraulic drive with a hydrostatic transmission that variably connects a power generator to the vessel main engine. See, for example, U.S. Pat. No. 7,485,979 to Staalesen, which is hereby incorporated by reference in its entirety. Another system that provides a hydraulic drive that variably connects a power generator to a vessel main engine is described in U.S. patent application Ser. No. 09/801,049, also to Staalesen.

The system described in these prior art references drives a generator from the main engine via a variable displacement hydraulic pump that is fluidly connected to a constant volume hydraulic motor. A hydraulic pump controller is used to control the pump displacement, relying on the frequency deviation on the generator output for controlling the hydraulic pump. The system described in the Staalesen patent drives a generator from the main engine with a variable displacement hydraulic pump, wherein the controller uses a pump speed input signal and a power frequency input signal to control a variable hydraulic pump, such that the fluid flow from the variable displacement hydraulic pump is substantially constant.

However, it is desirable to improve on the stability of the power generator output to provide a more consistent output power supply to the ship's onboard electronic systems. The present disclosure describes a power system with improved output power stability.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An electric power generator system is disclosed that includes a variable displacement hydraulic pump drivably connected to a main propulsion engine, a hydraulic motor driven by fluid from the hydraulic pump, and an electric generator drivably attached to the motor. A pressure sensor measures the hydraulic fluid driving pressure, and a frequency sensor measures the electric generator power frequency. A controller receives the pressure signal and the power frequency signal, and is configured to calculate a pressure set point based on the power frequency signal and adjusts the flow rate of hydraulic fluid from the variable hydraulic pump based on the difference between the calculated pressure set point and the pressure signal.

In an embodiment, the controller is configured to adjust the pressure set point based on the difference between the frequency indicated by the frequency signal and a predetermined frequency.

In an embodiment, the first hydraulic pump is an adjustable swash plate type pump.

In an embodiment, the electric load on the generator system is also used to calculate the pressure set point.

In an embodiment, a second hydraulic pump works cooperatively with the first hydraulic pump to drive the motor, and the pumps are operated sequentially.

An electric power generator system for a vehicle is disclosed that includes:
  a diesel engine that is configured to propel the vehicle, the diesel engine operating between an idle speed and a maximum speed;
  an electric generator that is configured to produce an alternating current for powering electrical equipment;
  a hydrostatic transmission drivably connecting the diesel engine with the electric generator such that the alternating current produced by the electric generator will have a constant frequency when the diesel engine is operated between the idle speed and the maximum speed, wherein the hydrostatic transmission comprises:
    (i) a first hydraulic pump drivably connected to the diesel engine, the first hydraulic pump having an adjustable mechanism for varying a flow rate of hydraulic fluid pumped by the first hydraulic pump;
    (ii) a hydraulic motor drivably connected to the electric generator, and fluidly connected to the first hydraulic pump such that hydraulic fluid circulated between the hydraulic pump and the hydraulic motor drives the hydraulic motor at a speed dependant on the flow rate of hydraulic fluid pumped by the first hydraulic pump;
    (iii) a pressure sensor that measures the pressure of the hydraulic fluid pumped by the first hydraulic pump;
    (iv) a frequency sensor that measures the frequency of the alternating current produced by the electric generator;

(v) a pressure controller that adjusts the first hydraulic pump mechanism to vary the flow rate of hydraulic fluid based on the measurement of the pressure sensor and a pressure set point;

(vi) a frequency controller that adjusts the pressure set point based on the measurement of the frequency sensor and a predetermined frequency set point.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

A family of systems is disclosed for power generating systems that use a closed loop hydrostatic transmission to produce a constant frequency electric power output using a variable-output mechanical power source, such as a primary drive marine engine, wind turbine, water turbine or the like. Conventional aspects of the hydrostatic transmission and related components are not described in detail herein, as they will be readily apparent to persons of skill in the art.

Figure 1:
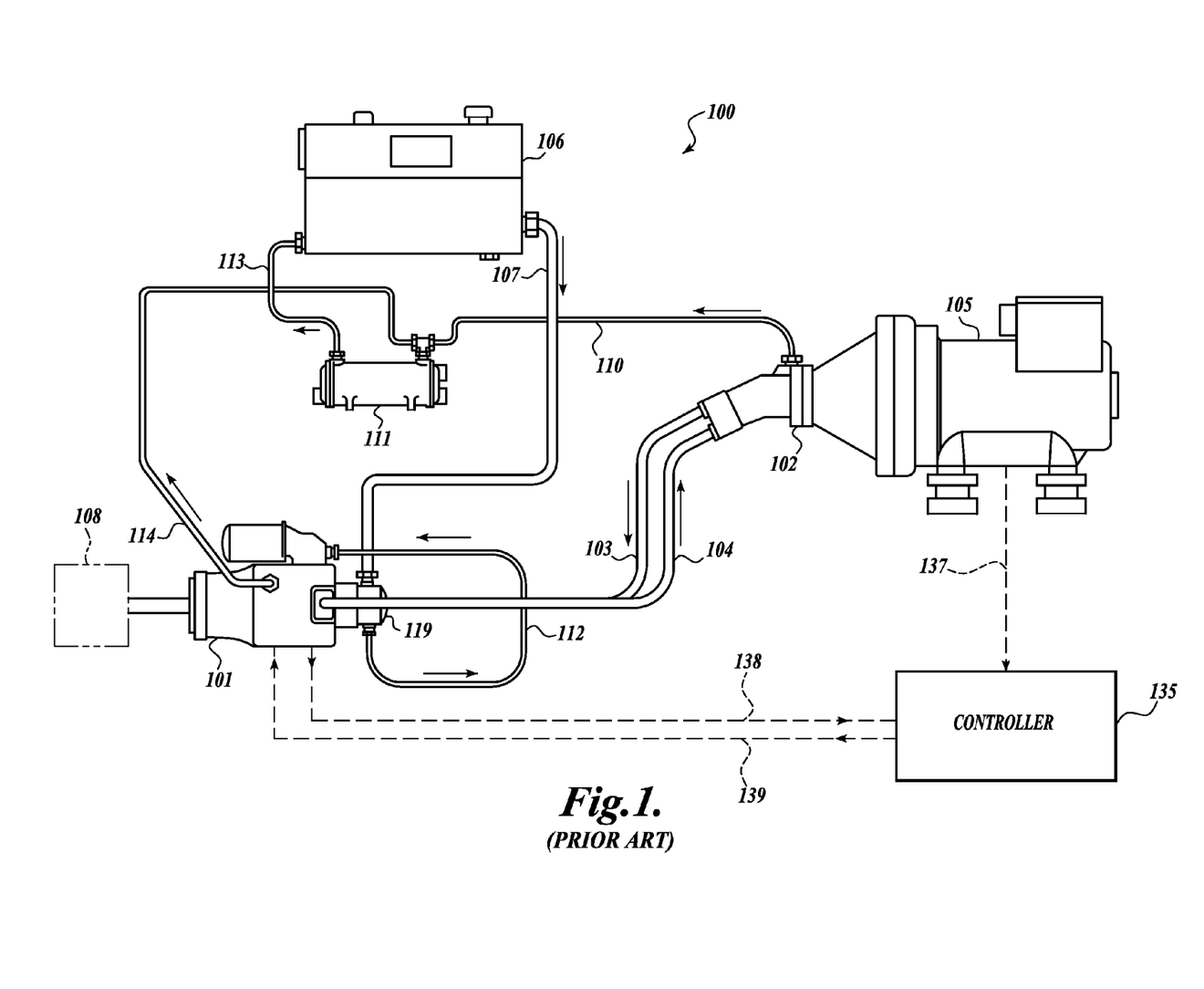
FIG. 1 illustrates an exemplary prior art marine generator system.

An exemplary prior art marine generator system 100 is shown in FIG. 1, based on the system disclosed in U.S. Pat. No. 7,485,979. The system 100 is powered by a main propulsion engine 108. A hydrostatic transmission is provided, comprising a variable displacement hydraulic pump 101 driven by the engine 108 and a constant volume hydraulic motor 102 that is connected directly to a generator 105. A controller 135 is provided for controlling the displacement of the variable displacement hydraulic pump 101, for example by controlling the position of a swash plate in the variable displacement hydraulic pump 101. Although a swash plate variable displacement pump is discussed herein, it will be apparent to persons of skill in the art that other variable displacement pumps may be used, for example a wobble pump, bent axis pump, radial piston pump, or the like. Similarly, although the present embodiment uses a constant volume hydraulic motor, it is contemplated that a variable displacement hydraulic motor may be used, for example either running at a constant displacement setting, or cooperatively adjusted to maintain a desired generator speed as discussed below.

During operation, the hydraulic pump 101 is driven from a power take-off of the main engine 108. The hydraulic pump 101 circulates hydraulic fluid to the hydraulic motor 102 through hoses 104 and returning through hose 103. It will be appreciated that the main engine 108 typically operates over a wide range of speeds during operation of the vessel, and the hydrostatic transmission is intended to drive the generator 105 at a constant speed, so that the generator 105 power output will maintain a constant frequency, notwithstanding a varying main engine speed.

The hydraulic motor 102 is drivably connected to the generator 105, and is driven by the primary flow of hydraulic fluid delivered under pressure from the hydraulic pump 101. The pressure of the hydraulic fluid delivered to the pump 101, e.g., the pressure between the pump 101 and the motor 102, is herein sometimes referred to as the driving pressure, or simply as the pressure. A secondary flow of the hydraulic fluid is diverted from the hydraulic pump 101 through hose 114 to the oil cooling system 111, and similarly a flow of hydraulic fluid is diverted from the hydraulic motor 102 to an oil cooling system 111 through hose 110. Cooled hydraulic fluid is directed from the oil cooling system 111 to a reservoir 106 through hose 113, and make-up hydraulic fluid is directed through hose 107 to a servo pump 119 and returned to the hydraulic pump 101 through hose 112. Although the described hydraulic fluid flow path is described to assist the reader in understanding the system, persons of ordinary skill in the art will understand that straightforward modifications to this system may be made without departing from the present invention.

Oil from the hydraulic pump 101 drives the hydraulic motor 102, which in turn drives the generator 105. The generator 105 rotational speed (and output power frequency) is therefore directly dependent on the rate of flow of hydraulic fluid from the hydraulic pump 101 to the motor 102.

In the system 100, the controller 135 controls the flow rate of hydraulic fluid from the variable displacement hydraulic pump 101, e.g., by controlling the position of the pump swash plate. The controller 135 receives a power frequency input signal 137 from a transformer or an electronic frequency transmitter that is electrically connected to, or integrated into, the generator 105, and a pump speed input signal 138 from the hydraulic pump 101. In an embodiment, the power frequency input signal 137 is generated by a pulse/frequency transmitter indicating the AC frequency of the power generated by the generator 105. These two input signals 137, 138 are utilized by the controller 135 to generate an output control signal 139 to the hydraulic pump 101, to selectively control the rate of flow of hydraulic fluid from the hydraulic pump 101, the output control signal 139 being calculated to maintain an approximately constant flow rate from the hydraulic pump 101.

The gear ratio of the hydrostatic transmission is determined by the displacement ratio of the hydraulic pump 101 and hydraulic motor 102. Typically, the displacement of the hydraulic pump 101 can be varied from zero to full capacity by the controller 135. The displacement of the hydraulic pump 101 is controlled by controlling the swash plate angle, which may be accomplished by adjusting a control current provided to the hydraulic pump 101.

The main engine 120 is connected to the variable hydraulic pump 101 through a gearbox (not shown). In marine applications, for example, sea water may be used as a working fluid for the heat exchanger for the oil cooling system 111, as described in the incorporated Staalsen patent.

The variable hydraulic pump 101 provides the hydraulic motor 102 with a relatively constant flow rate of hydraulic fluid, so that the hydraulic motor 102 rotates with an approximately constant speed. The hydrostatic transmission is necessary such that the flow from the variable hydraulic pump 101 remains relatively constant even as the hydraulic pump 101 rotational speed varies. The controller 135 is configured to control the displacement of the hydraulic pump 101 such that a constant frequency power supply is produced by the generator 105.

A detailed mathematical description of hydrostatic transmissions may be found, for example, in *Regulation of Synchronous Generators by Means of Hydrostatic Transmissions*, J. Cidras and C. Carrillo, IEEE Transactions on Power Systems Vol. 15, No. 2, May 2000 and *Modelling and identification of a hydrostatic transmission hardware-in-the-loop simulator*, K. Wu, Q. Zhang and A. Hansen, Int. J. Vehicle Design, Vol. 34, No. 1, 2004, ["Regulation of Synchronous Generators by Means of Hydrostatic Transmissions," J. Cidras and C. Carrillo, IEEE *Transactions on Power Systems* 15(2), May 2000, and "Modelling and Identification of a Hydrostatic Transmission Hardware-in-the-Loop Simulator," K. Wu, et al., *Int. J. Vehicle Design,* 34(1), 2004,] both of which are hereby incorporated in their entirety. For simplicity, and to better focus on the present invention, leaks and other losses in the system are ignored in the following description.

Figure 2:
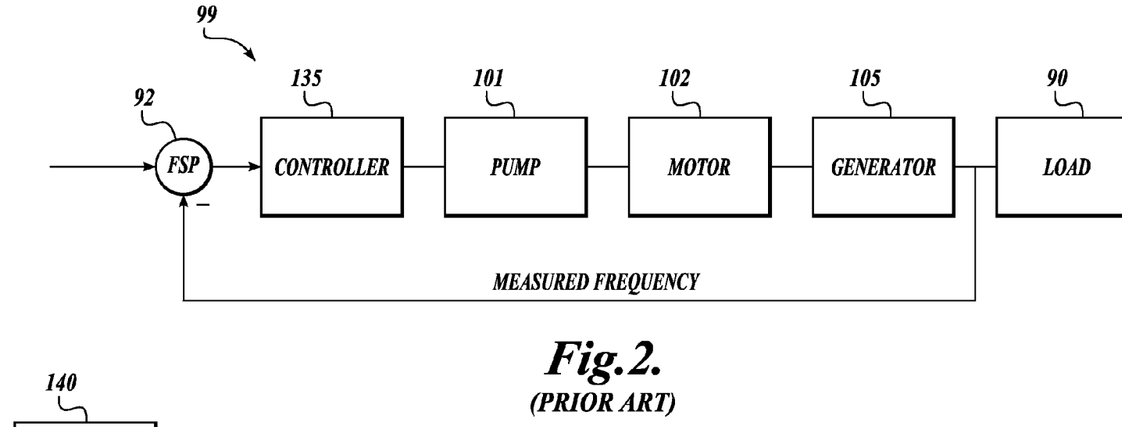
FIG. 2 shows a system control diagram for a prior art hydrostatic transmission for a power generator system.

In an exemplary prior art system illustrated schematically in FIG. 2, the hydrostatic transmission 99 is operated to achieve a constant frequency of the generated electric power while the main engine speed and the electric load on the generator varies within certain limits. For this system, a controller 135 receives the measured frequency from the generator 105 and continuously compares the measured frequency to a predetermined frequency set point (FSP) 92, typically 60 Hz. Any deviation from the frequency set point 92 is compensated for by the controller 135. If the hydraulic pump 101 is a swash plate pump, the controller 135 acts on the pump displacement by adjusting the hydraulic pump's 101 swash plate control current.

The motor 102 is directly coupled to the generator 105 and the desired motor speed is the speed required to obtain the desired generator frequency. For example, a typical generator 105 may be operated at 1800 rpm to produce 60 Hz output. The hydraulic fluid flow from the hydraulic pump 101 may be readily calculated for a given motor 101 speed and displacement. In an ideal system, the nominal flow is given only by these factors, independent of the engine speed and the system load 90. The hydraulic pump 101 delivers a constant flow to the motor 102 and builds up a pressure that produces a torque in the motor 102 equal to the torque demand of the generator 105 to rotate at the desired nominal speed.

Thus the pressure is directly determined from the generator 105 torque, i.e., proportional to the electric load 90 on the generator 105. The pressure is adjusted by momentarily adjusting the hydraulic pump 101 flow above or below the nominal flow rate. In practice, due to leak flow increasing with pressure, the steady state flow must also increase a little to maintain the motor speed. A frequency controller 135 that controls the pump displacement as described above only controls the flow and lets the pressure, implicitly, be whatever is needed to achieve a desired motor speed.

As the main engine 108 speed changes, the hydraulic pump 101 displacement (e.g., swash plate position) must also be adjusted to maintain the desired constant flow rate. In this case, the swash plate excursions are typically larger than when just adjusting the pressure to compensate for load changes. Engine speed compensation therefore has a relatively longer characteristic time, resulting in larger frequency deviations from the generator 105.

A feed forward control can be used to speed up this response. For example, the nominal flow versus engine speed function can be found by calibration. More precisely, oil flow increases linearly with engine speed if the pump displacement is constant. So the displacement (generally proportional to the swash plate angle in a swash plate-type pump) will follow an inverse function for a constant oil flow. The feed forward from the engine speed to the swash plate current will therefore also be an inverse function.

Figure 3:
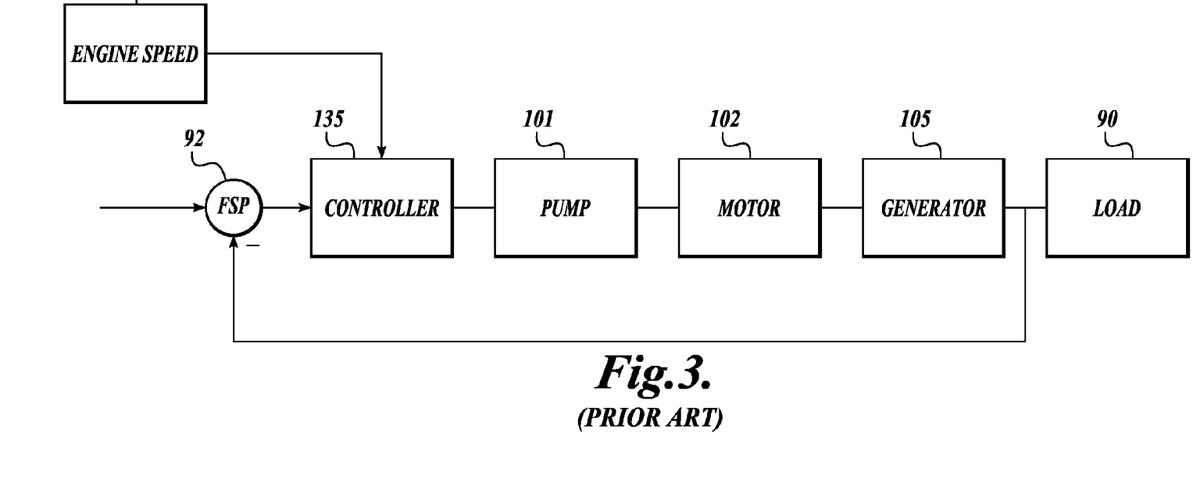
FIG. 3 shows a system control diagram for a power generator system in accordance with a first embodiment of the present invention and using an engine speed feed forward signal in cooperation with a frequency feedback.

It may be more convenient to find or determine a nominal swash plate current versus engine speed relation or function. This function may vary with time, temperature and other factors. In the system shown in FIG. 3, an engine speed feed forward is implemented by adding a current derived from engine speed 140 to the swash plate control current through the controller 135. It will be appreciated that the feed forward signal 140 reacts immediately on engine speed changes and thereby quickly moves the swash plate to the approximately correct position to maintain flow. Therefore, the system corrects the hydraulic pump 101 swash plate setting in response to engine speed 140 changes before the engine speed change is reflected in changes in the frequency output of the generator 105. The frequency signal from the generator 105 is also fed back to the controller 135 and used to fine-tune the swash plate setting. This engine-speed feed forward is believed to be similar to the system disclosed in U.S. Pat. No. 7,485,979, mentioned above.

Pressure Control Loop

The control loop discussed with respect to the hydrostatic transmission 99 shown in FIG. 2 measures the generator 105 output frequency and controls the hydraulic pump 101 swash plate current based on the generator frequency deviation. The generator frequency may be measured (or derived), for example by measuring the generated current/voltage or from using separate pickup detecting the rotation of the motor or generator shaft. Any suitable pickup known in the art may be used, including mechanical, optical or magnetic pickups. There are many elements between the control current the generator 105 speed that are only implicitly controlled, for example the real swash plate position, flow rate, and pressure. This limits the maximum speed of the compensation. A faster control may be achieved using information obtained by measuring other states of the system, for example the true swash plate angle, the flow rate and the hydraulic fluid pressure. Of these, the most robust, practical and economically feasible sensor is for the pressure. As described above, the desired pressure will depend primarily on the generator load 90.

Figure 4:
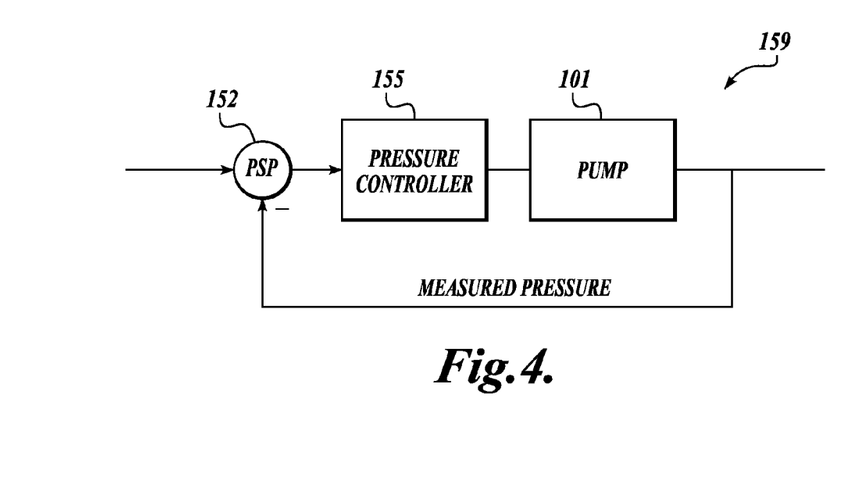
FIG. 4 shows a system control diagram for a portion of a power generator system using a pressure loop to control the pump swash plate.

Refer now to the system 159 shown in FIG. 4. In this embodiment, a pressure controller 155 receives or measures the hydraulic fluid pressure exiting the hydraulic pump 101, compares the measured pressure with a pressure set point (PSP) 152 and controls the pump 101 swash plate current to achieve minimum deviation in the pressure. It will be appreciated by comparing FIG. 4 with FIG. 2 that the pressure control loop only contains the dynamics of the swash plate and ancillary effects such as the hydraulic fluid/hose elasticity and can therefore react faster than the frequency control loop described above, which also includes the dynamics of the rotating masses of the rotor and generator 105.

When the engine speed varies, the pressure loop illustrated in FIG. 4 will react quickly to maintain the pressure at the given set point. However, the pressure needed to maintain the correct generator 105 frequency varies with several factors. Therefore, the pressure loop system is modified as illustrated by the embodiment shown in FIG. 5, wherein the pressure set point 152 is controlled by an outer frequency controller 135 that measures the generated frequency and continuously adjusts the pressure set point 152 to a desired value to maintain a constant frequency output based on a frequency set point (FSP) 92.

Figure 5:
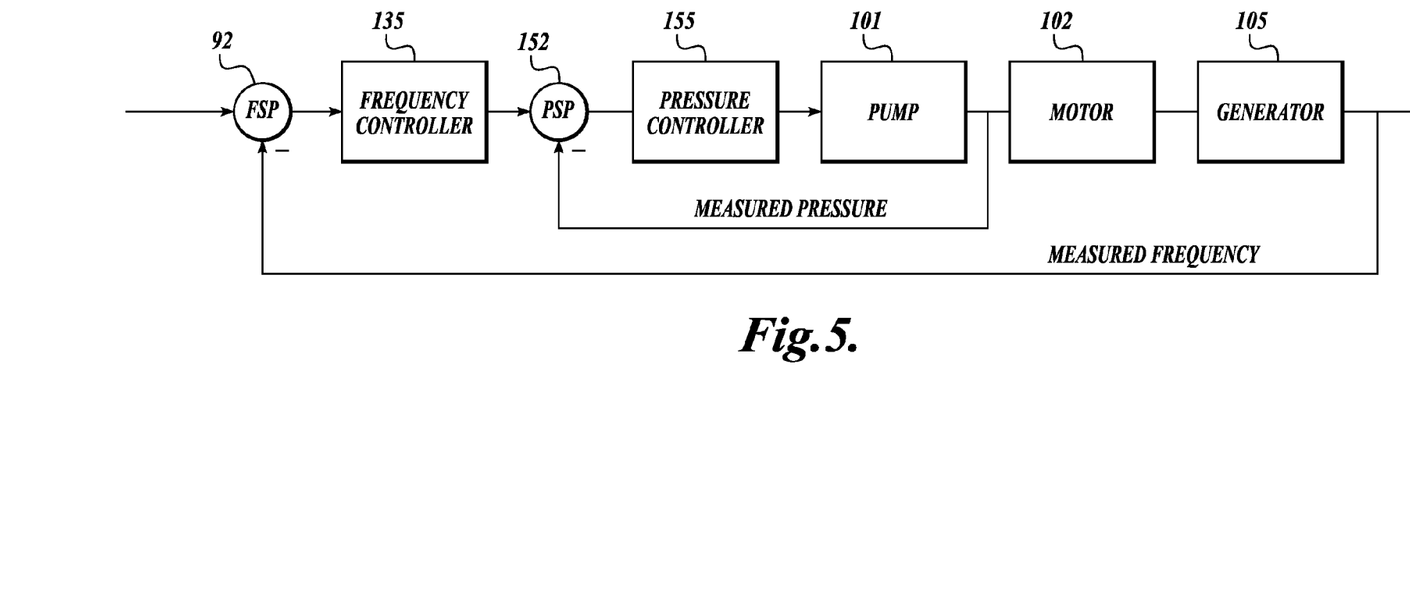
FIG. 5 shows a system control diagram for a power generator system in accordance with another embodiment of the present invention and using an inner pressure loop and an outer frequency control loop that adjusts the pressure set point.

The outer frequency loop now controls the pressure set point 152 to the correct level, primarily compensating for changes in electric load, while the inner pressure loop maintains the correct pressure as the engine speed varies. In this control structure there is no need for an engine speed feed forward. However, changes in electric load must cause the rotating masses of the motor 102 and generator 105 to change before these disturbances are detected and acted upon by the frequency controller 135. It will be apparent to persons of skill in the art that although the frequency controller 135 and the pressure controller 155 are discussed separately, they may conveniently be implemented in a single device.

Figure 6:
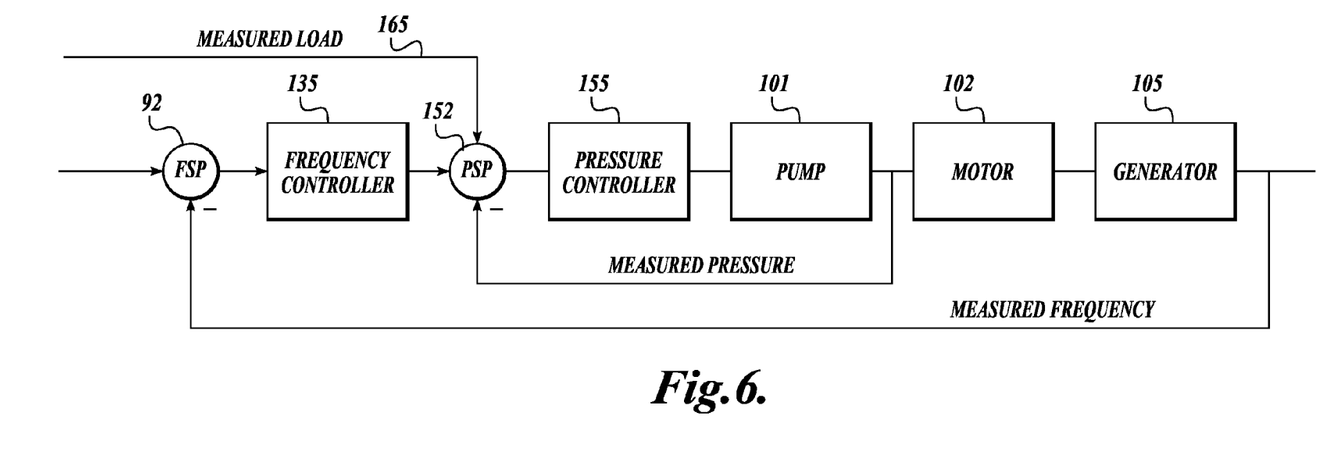
FIG. 6 shows a system control diagram for a power generator system similar to the system shown in FIG. 5, and further including a measured load feed forward signal.
Figure 7:
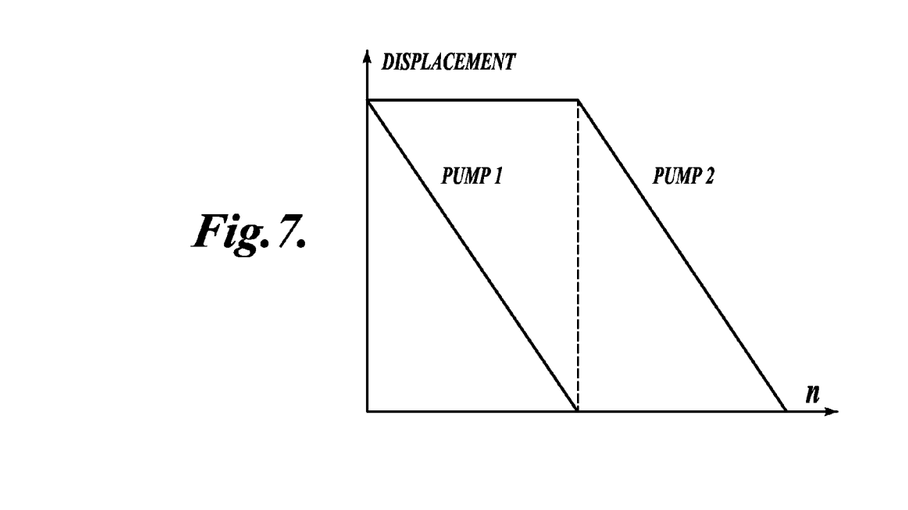
FIG. 7 is a plot illustrating the control strategy for a two-pump embodiment of a system in accordance with the present invention.

FIG. 6 illustrates an embodiment that speeds up the response to electric load changes using a feed forward 165 from the measured electric load. In this embodiment, the electric load demand is monitored, and the monitor generates a continuous or periodic signal corresponding to the measured load. The load signal is provided to the controller 152 and used to calculate the desired pressure set point 152. In this embodiment, as soon as the load changes the pressure set point 152 will thus be moved to a new approximately correct value. As discussed for the previous embodiment, feedback from the outer frequency loop is also provided to the frequency controller 135 for calculating the desired pressure set point.

Engine Speed Range Limits

Given the maximum speed of the main engine 108 (e.g., the ship's main engine) and maximum pump 101 speed allowed a gear ratio or ratio between the main engine 108 and pump 101 shafts can be determined. This situation corresponds to the minimum steady state swash plate position. The lower pump speed limit is given by the nominal fluid flow demanded by the motor 102 and the maximum displacement of the pump 101. The lowest main engine 108 speed is therefore given by the lower pump speed limit and the gear ratio. If there is a demand for lowering the minimum speed below this limit, there are three primary options: (i) increase the pump 101 displacement, (ii) increase the gear ratio, and/or (iii) decrease the motor 102 displacement.

The pump size can only be increased to a certain level determined by the size of pumps that are on the market, so the maximum achievable pump displacement has a practical limit. Instead of increasing the displacement by increasing the pump size, we can increase the number of hydraulic pumps 101. However, if multiple hydraulic pumps 101 are used, the control structure must also be changed.

The flow demand can be reduced by decreasing the motor 102 displacement, e.g., by controlling the motor swash plate. Although reducing the motor displacement reduces the demand and therefore allows for a lower engine speed, the reduced hydraulic fluid flow also reduces the power the motor 102 and generator 105 can produce. It is contemplated, however, that this strategy may be applied in situations wherein high power outtake is not required when operating the engine in a low speed mode.

Another option is to drive the hydraulic pump 101 through a transmission with a controllable gear ratio. For example, a higher gear ratio may be used at low engine speeds to maintain the pump speed in an acceptable range. A continuously controlled variable gear is usually not feasible, but one may use a gear with two or more fixed gear ratios, manually or remotely switchable. In this case, the gear ratio is shifted according to the ship's mode of operation.

The maximum displacement demand can be achieved by using two or more hydraulic pumps 101 in parallel, adding both pumps' flow to drive the motor 102. A simple controller might feed all of the pumps 101 with the same control current, thus setting the swash plate for each pump 101 to the same angle. However, when two or more pumps 101 are operated in parallel in this way, fluid pressure interaction may introduce instabilities, such that the swash plates enter an oscillatory mode, which is highly undesired.

A better strategy is to control the pumps 101 sequentially, i.e., such that all pumps 101 except one are in a fixed output mode, typically either fully on or fully off. The pump swash plates will therefore not interact. For example, when the main engine speed is at a minimum, all pumps 101 may be fully on, i.e., with all swash plates at maximum angle to provide maximum displacement. As the engine speed increases, the swash plate angle of the first pump 101 is reduced until the first pump is fully 'off.' As the engine speed increases further, the second pump swash plate is controlled to reduce output, and so on.

FIG. 6 illustrates this exemplary pump displacement control, wherein the horizontal axis indicates the pump speed, n, and the vertical axis indicates the pump displacement (e.g., swash plate setting). This system comprises two pumps (Pump1 and Pump2) although the extension to more than two pumps is trivial. Pump speed is determined by the main engine speed. Therefore when the engine is idling at a low speed (low rpm), Pump1 and Pump2 operate at maximum displacement to produce sufficient flow to maintain the generator at the desired operating speed. As the engine and pump speed increase, Pump1 displacement is controlled to produce the desired generator frequency output, and Pump2 displacement is maintained at maximum. As the engine speed increases further, when Pump1 displacement reaches a minimum, Pump2 is controlled to produce the desired generator frequency output, while Pump1 is maintained at its minimum displacement. It will be appreciated by persons of skill in the art that this exemplary pump displacement control has the added advantage of maximizing the total efficiency because pump efficiency is highest at maximum swash plate angle.

In a multiple pump system, the sequencing of the pumps does not have to be fixed. To avoid undue or uneven wear on a particular pump, in one embodiment the sequence order for controlling the pumps is changed every time the system is turned on, or at a set time interval.

It is known that there may be some uncertainty about a pump's real swash plate angle versus the control current near the end points (maximum settings). One pump may reach its fully "on" (maximum displacement) position before the next pump starts to produce any flow, or both pumps may provide increasing flow at the same time. Therefore, the ideally linear current/flow characteristics may be distorted in the cross over region wherein an additional pump is engaged or disengaged.

Figure 8:
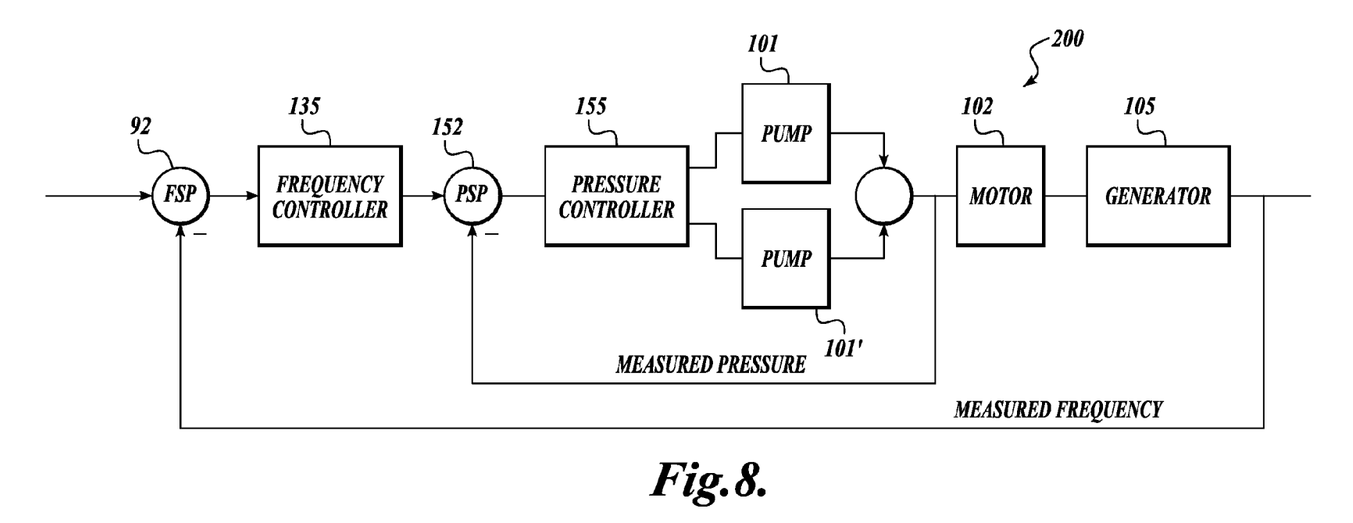
FIG. 8 is a system control diagram for a power generator system in accordance with the present invention and having two pumps, an inner pressure control loop and an outer frequency control loop.

FIG. 8 illustrates an embodiment of a power generator control system 200 similar to the system shown in FIG. 5, but using multiple pumps 101. In this system, a pressure controller 155 controls two or more pumps 101, 101' according to the strategy described above, always keeping all but one pump either fully on or fully off (e.g., either at a minimum flow rate which may be zero, or at a maximum flow rate). If the pressure loop is significantly faster than the frequency loop, any such distortions will not be observed by the outer frequency loop because the pressure loop swiftly adjusts the pressure to what the outer loop demands.

Variable Motor Displacement

Figure 9:
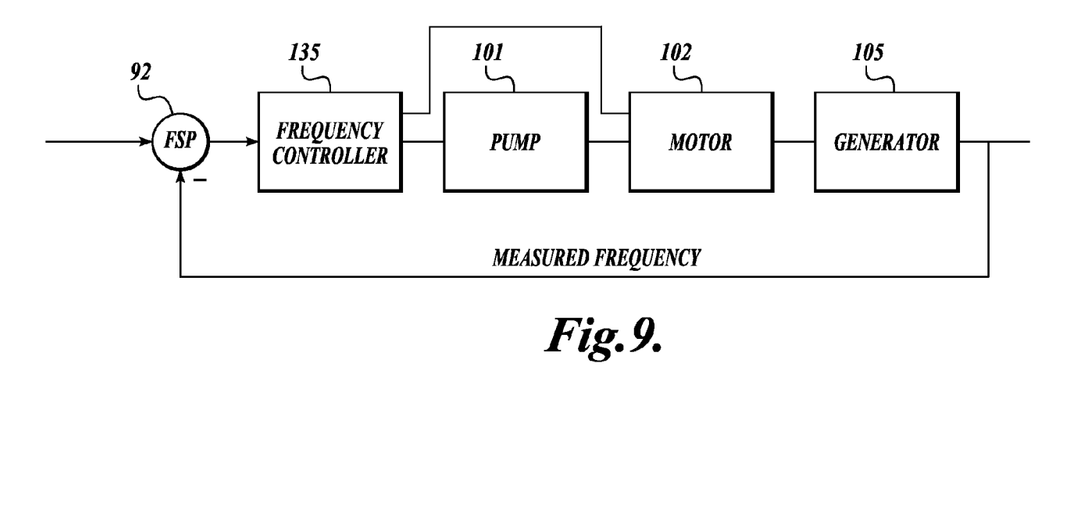
FIG. 9 is a system control diagram for a power generator system in accordance with the present invention and utilizing a variable hydraulic motor with a variable displacement hydraulic pump.
Figure 10:
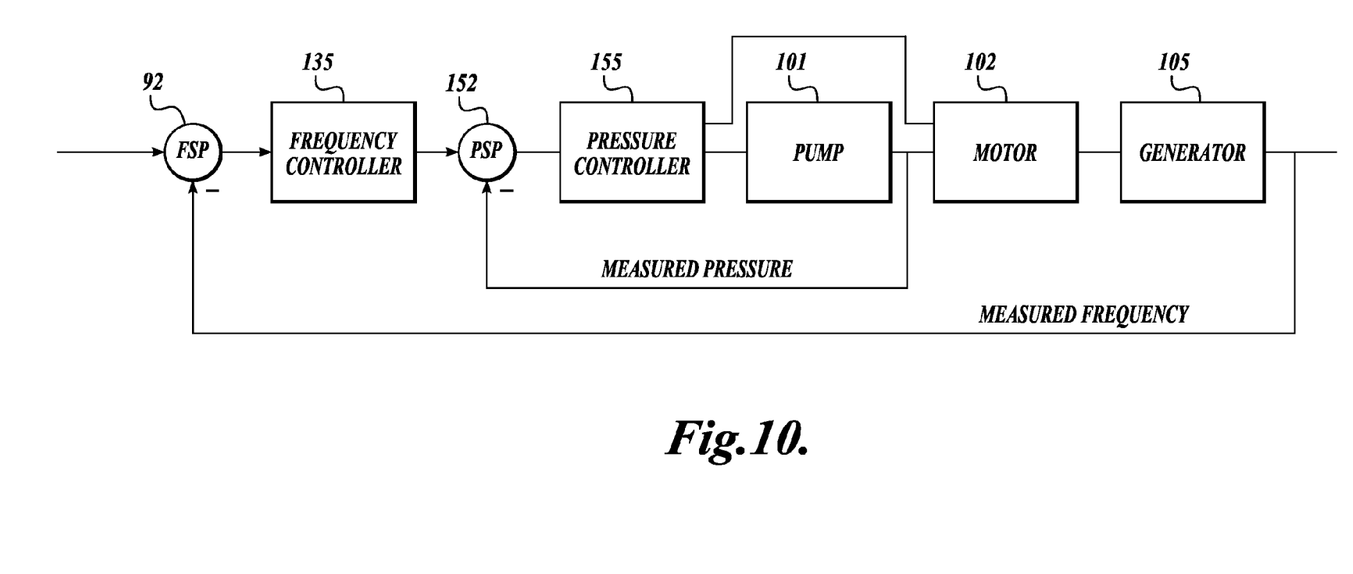
FIG. 10 is a system control diagram for a power generator system in accordance with the present invention and a variable displacement hydraulic motor, a variable displacement hydraulic pump, an inner pressure control loop and an outer frequency control loop.

In some applications, there may be a low demand for electric power when operating in modes where the main engine 108 runs at a low speed. In such cases, an alternative to using multiple pumps 101 is to provide a variable motor 102 and control the swash plate angle of the motor 102 in addition to the pump 101 swash plate. An embodiment using this strategy is illustrated in FIG. 9. The control strategy in this embodiment is to keep the motor 102 at maximum displacement as long as the pump 101 can supply sufficient flow. When the engine speed decreases below this limit, the pump 101 is kept at maximum displacement while the displacement of the motor 102 is turned down. A similar configuration with a pressure controller is illustrated in FIG. 10.

Power Measurements

The power supplied by the generator can be measured by measuring the voltage and multiplying by the current while taking the voltage/current phase difference into account (i.e., $P=i*V*\cos(\Phi)$). The current, i, can be measured by one current transformer for each phase and the voltage, V, by transformers between the phase cables. Assuming symmetrical loads, as will be the case for large consumers like motors, the current in only one phase needs to be measured.

However, the energy supplied may also be calculated from the motor speed and the pressure, minus estimated losses. The motor always runs at nominal speed, so by measuring the pressure the electric power supplied to the ship can be continuously monitored. The energy produced is the sum over time of the power, so it can be calculated by integration of the power. The losses in both the motor and generator are small and can easily be calculated with enough precision. The pressure sensor will therefore be a relatively inexpensive and simple sensor for both power and energy.

Although the particular embodiments described above are described generally with reference to a mobile ship-mounted application, it is contemplated that the novel aspects of the hydrostatic transmission system may be applied in other applications. For example, in wind power systems the wind turbine speed is typically dependent on the vagaries of the wind. The system disclosed herein may be applied to using the wind turbine to drive a power generator at a constant speed.

While illustrative embodiments have been illustrated and described, it will be appreciated that various changes can be made therein without departing from the spirit and scope of the invention.

The embodiments of the invention in which an exclusive property or privilege is claimed are defined as follows:

1. An electric power generator system operably connected to a main propulsion engine for a vehicle, the generator system comprising:
   a variable displacement first hydraulic pump drivably connected to the main propulsion engine, the first hydraulic pump including a mechanism for adjusting a flow rate of hydraulic fluid from the first hydraulic pump;
   a hydraulic motor fluidly connected to the first hydraulic pump such that the hydraulic fluid flow from the first hydraulic pump drives the hydraulic motor, the hydraulic fluid having a driving pressure between the first hydraulic pump and the hydraulic motor;
   an electric generator drivably attached to the hydraulic motor, the electric generator generating an alternating current having a frequency;
   a pressure sensor that generates a pressure signal indicating the driving pressure of the hydraulic fluid;
   a frequency sensor electrically connected to the electric generator that generates a power frequency signal; and
   a controller that receives the pressure signal and the power frequency signal, wherein the controller is configured to calculate a pressure set point based on the power frequency signal and adjusts the flow rate of hydraulic fluid from the variable hydraulic pump based on the difference between the calculated pressure set point and the pressure signal.

2. The electric power generator system of claim 1, wherein the pressure set point is adjusted based on the difference between a predetermined frequency set point and a frequency indicated by the frequency signal.

3. The electric power generator system of claim 1, wherein the pressure sensor is disposed between the first hydraulic pump and the hydraulic motor.

4. The electric power generator system of claim 1, wherein the power frequency sensor is a pulse/frequency transmitter.

5. The electric power generator system of claim 1, wherein the first hydraulic pump comprises an adjustable swash plate.

6. The electric power generator system of claim 1, further comprising an oil cooling system.

7. The electric power generator system of claim 1, further comprising a load monitor that monitors the electric load on the generator system and produces a load signal, wherein the load signal is provided to the controller and used to calculate the pressure set point.

8. The electric power generator system of claim 1, further comprising a variable displacement second hydraulic pump drivably connected to the main propulsion engine, the second hydraulic pump including a mechanism for adjusting a flow rate of hydraulic fluid from the second hydraulic pump that is adjusted by the controller, and wherein the hydraulic fluid flow from the second hydraulic pump, cooperatively with the hydraulic fluid flow from the first hydraulic pump, drives the hydraulic motor.

9. The electric power generator system of claim 8, wherein the first and second hydraulic pumps are adjusted sequentially such that during operation at least one of the first and second hydraulic pumps are either fully on or fully off.

10. The electric power generator system of claim 8, wherein during operation the second hydraulic pump is not engaged unless the first hydraulic pump is at a maximum displacement, and the first hydraulic pump is not decreased below the maximum displacement unless the second hydraulic pump is not engaged.

11. An electric power generator system for a vehicle comprising:
   a diesel engine that is configured to propel the vehicle, the diesel engine operating between an idle speed and a maximum speed;
   an electric generator that is configured to produce an alternating current for powering electrical equipment; and
   a hydrostatic transmission drivably connecting the diesel engine with the electric generator such that the alternating current produced by the electric generator will have a constant frequency when the diesel engine is operated between the idle speed and the maximum speed, wherein the hydrostatic transmission comprises:
(i) a first hydraulic pump drivably connected to the diesel engine, the first hydraulic pump having an adjustable mechanism for varying a flow rate of hydraulic fluid pumped by the first hydraulic pump;
(ii) a hydraulic motor drivably connected to the electric generator, and fluidly connected to the first hydraulic pump, such that hydraulic fluid circulated between the hydraulic pump and the hydraulic motor drives the hydraulic motor at a speed dependant on the flow rate of hydraulic fluid pumped by the first hydraulic pump;
(iii) a pressure sensor that measures the pressure of the hydraulic fluid pumped by the first hydraulic pump;
(iv) a frequency sensor that measures the frequency of the alternating current produced by the electric generator;
(v) a pressure controller that adjusts the first hydraulic pump mechanism to vary the flow rate of hydraulic fluid based on the measurement of the pressure sensor and a pressure set point; and
(vi) a frequency controller that adjusts the pressure set point based on the measurement of the frequency sensor and a predetermined frequency set point.

12. The electric power generator system of claim 11, wherein the pressure sensor is disposed between the first hydraulic pump and the hydraulic motor.

13. The electric power generator system of claim 11, wherein the power frequency sensor is a pulse/frequency transmitter.

14. The electric power generator system of claim 11, wherein the first hydraulic pump comprises an adjustable swash plate.

15. The electric power generator system of claim 11, further comprising an oil cooling system.

16. The electric power generator system of claim 11, further comprising a load monitor that monitors the electric load on the generator system and produces a load signal, wherein the load signal is provided to the controller and used to calculate the pressure set point.

17. The electric power generator system of claim 11, further comprising a second hydraulic pump drivably connected to the diesel engine, the second hydraulic pump including an adjustable mechanism for varying a flow rate of hydraulic fluid pumped by the second hydraulic pump, wherein the hydraulic fluid from the second hydraulic pump is configured to drive the hydraulic motor cooperatively with the hydraulic fluid flow from the first hydraulic pump.

18. The electric power generator system of claim 17, wherein the first and second hydraulic pumps are adjusted sequentially, such that during operation at least one of the first and second hydraulic pumps are either fully on or fully off.

* * * * *